April 11, 1961 — R. P. HEUER, JR — 2,979,393
PROCESS OF DESULFURIZING PIG IRON
Filed Oct. 2, 1958
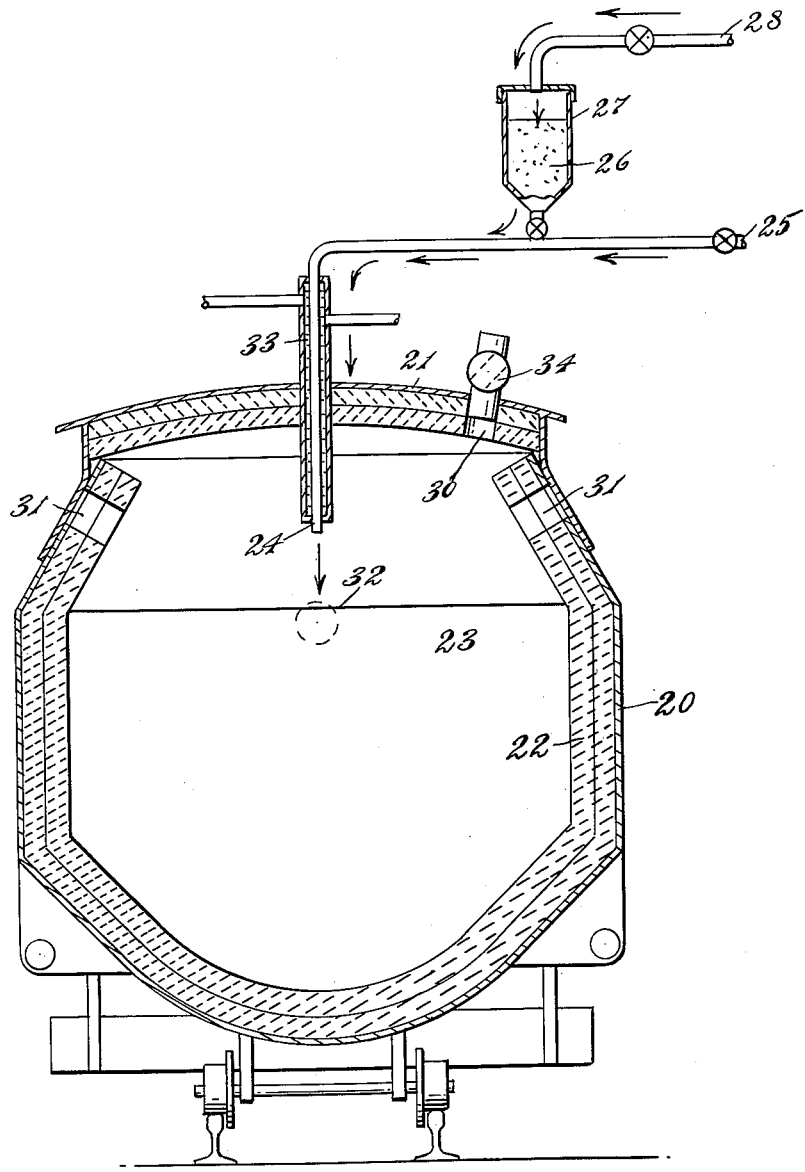
INVENTOR
Russell Pearce Heuer, Jr.
BY
ATTORNEYS

2,979,393
PROCESS OF DESULFURIZING PIG IRON

Russell Pearce Heuer, Jr., 1241 Ridgewood Road, Bryn Mawr, Pa.

Filed Oct. 2, 1958, Ser. No. 764,840

6 Claims. (Cl. 75—51)

The present invention relates to a process of desulfurizing pig iron.

A purpose of the invention is to desulfurize molten pig iron in a reaction vessel under strong reducing conditions by means of a nonliquid (solid) desulfurizing agent.

A further purpose is to bring the molten iron into contact with the desulfurizing agent by means of a stream of nitrogen gas in which the desulfurizing agent is suspended or gas-borne, the stream of gas being ejected at high velocity from a lance above the surface of the molten iron so that it makes good contact with the molten iron.

A further purpose is to enclose the molten iron and the stream of gas in a reaction vessel to protect the stream from contamination with air or oxidizing gases during its passage from the lance and also to protect against carrying air or oxidizing gases by the stream into contact with the molten iron.

A further purpose is to intensify the reducing condition attending the stream of nitrogen gas and the suspended desulfurizing agent in the gas by mixing with the desulfurizing agent a deoxidizing agent, such as aluminum powder or magnesium powder.

A further purpose is to use a nonliquid desulfurizing agent capable of combining with the sulphur in the molten pig iron to form calcium sulphide, as for example, powdered calcium oxide or burned lime, calcium carbide, calcium cyanamide or the like.

Further purposes appear in the specification and in the claims.

In the drawings I have chosen to illustrate one only of the numerous embodiments in which the invention may appear, selecting the form shown from the standpoints of convenience in illustration, satisfactory operation and clear demonstration of the principles involved.

The figure is a central vertical section of a reaction vessel in which the invention is being applied.

Where reference herein is made to pig iron, it is intended to designate an alloy of iron having a high content of carbon, such as 3 to 4% or more, with varying contents of silicon, manganese, phosphorus and sulphur as conventionally obtained from the iron blast furnace, the cupola, the air furnace, or any other suitable source.

The removal of sulphur from pig iron by a nonliquid desulfurizing agent has been taught in the prior art. Use for this purpose has been made of powdered burned lime. The lime has been brought into contact with the molten pig iron by placing it in a cylindrical vessel with the pig iron and rotating the vessel. The mechanical difficulties of large rotating furnaces, however, create serious problems. Furthermore, when there are large amounts of iron used, the process is slow and the residual sulphur in the iron at the end of the process may still be high.

U.S. Patent 2,587,573 taught the blowing in of powdered burned lime or calcium carbide by a stream of inert gas from a tuyere opening placed below the surface of the molten pig iron. The patent taught the use of a closed vessel to exclude the atmosphere and oxidizing gases.

The present invention constitutes an improvement over the foregoing process. The solid desulfurizing agent used is powdered lime, powdered calcium carbide, powdered calcium cyanamide, or a similar desulfurizing agent. The gas used is nitrogen, hydrogen, or helium or other monatomic inert gas, such as neon, krypton or xenon, or a mixture of any of these. The gas carrying the solid desulfurizing agent as a suspension is projected at a high velocity in a stream brought to the upper surface of the molten iron by a lance placed above the molten iron. The high velocity gas stream impinges upon the surface of the molten iron and brings the suspended powdered desulfurizing agent into contact with the iron. The impinging gas stream brings about several different effects.

It causes the molten iron to circulate, thus bringing additional molten iron to an accessible position for desulfurization. It causes thorough contact between the solid powdered desulfurizing agent and the molten iron. It tends to make the molten iron wet the solid powdered desulfurizing agent, tends to break up any clumps of the desulfurizing agent, and tends to distribute the powdered desulfurizing agent uniformly throughout the molten iron.

It is preferred to use powdered burned lime as the desulfurizing agent because of low cost.

The desulfurizing reaction is expressed as follows:

$$CaO + \tfrac{1}{2}S_2 \rightleftharpoons CaS + \tfrac{1}{2}O_2 \qquad (1)$$

This reaction is influenced by the activity of the sulphur and the oxygen. In order to reduce the activity of the sulphur to a minimum, the activity of the oxygen should also be reduced to a minimum. Normally the activity of the oxygen is controlled by the following reaction, since carbon is present in the molten iron:

$$C + \tfrac{1}{2}O_2 = CO \qquad (2)$$

In this reaction the activity of the oxygen falls as the activity of the carbon monoxide falls.

The impinging stream of nitrogen reduces the activity of the carbon monoxide because the nitrogen stream carries the carbon monoxide away from the reacting system, the nitrogen gas acting in effect as a carrier to remove carbon monoxide.

For good results I find that it is desirable to use very large quantities of nitrogen gas, for example, more than 10 cubic feet of nitrogen at normal temperature and pressure per ton of iron. Similar quantities of hydrogen or other inert (including reducing) gas should be used if this is employed instead of nitrogen.

The velocity of the gas stream as it impinges upon the iron is dependent upon the gas supply pressure and the size of the gas orifice. For good results, the gas pressure behind the lance nozzle should be at least one atmosphere above the pressure in the reaction vessel and preferably ten atmospheres or more above the pressure in the reaction vessel. The orifice diameter should preferably be in the range between 1 inch to 2 inches, considering a ladle of 100 tons pig iron capacity.

The circulation which the gas stream induces in the molten iron increases with the pressure.

Starting with molten pig iron containing, for example, 0.060% sulphur by weight, and treating this with powdered burned lime to the extent of 2% of the weight of the molten pig iron, using between 10 and 100 cubic feet or more at normal temperature and pressure of nitrogen or other inert gas as mentioned per ton of iron, with a time of treatment of 30 to 60 minutes, more than 90% of the original sulphur content is removed, leaving a sulphur content less than 0.004% and often less than 0.002% by weight.

The molten pig iron is placed in a closed vessel excluding the atmosphere or other oxidizing gases. The stream of gas creates a pressure within the vessel which is sufficiently above the external pressure to prevent infiltration of air. This protects the stream of gas and solid desulfurizing agent as it blows from the lance to the surface of the molten pig iron from oxidation from the surrounding atmosphere. For best results it is necessary to use a gas such as nitrogen, which has an oxygen content less than 0.5% by volume. For best results it is desired that the desulfurizing agent, such as powdered burned lime, be free from water and from carbon dioxide. Usually powdered burned lime contains substantial quantities of these substances, such as 1 to 3%. These impurities have a deleterious effect on the desulfurizing reaction because they increase the oxygen activity prevailing for the desulfurizing reaction. It is difficult to remove such impurities and it is possible to tolerate them by mixing the powdered burned lime with from 1 to 5% and preferably about 2% by weight of powdered aluminum, powdered magnesium, or powdered silicon or other metallic powdered deoxidizing agent. These metals reduce the oxygen activity at the reaction and facilitate desulfurizing.

The invention may be practiced by introducing the molten iron in a suitable closed vessel, such as a covered ladle shown in the drawing. A mixer type ladle as conventionally used in transferring iron from a blast furnace or a mixer such as used in storing molten iron is suitable. The iron should be free from any accompanying blast furnace slag or other contamination. The vessel 20 has a tight refractory lined cover 21, a refractory lining 22 and a charge of molten pig iron 23. The lance 24 extends into the vessel through the cover and is supplied with a stream of nitrogen or other inert gas as mentioned at 25 in which is suspended the desulfurizing agent 26 by an injector 27 supplied with nitrogen or other inert gas at 28. A cover escape vent 30 carries off the excess gas. There are pouring openings at 31 available to discharge the molten pig iron.

The desulfurizing agent is desirably ground so that 90% of it passes through a Tyler standard 40 mesh per linear inch screen. The quantity of desulfurizing agent shall be between 1 pound and 50 pounds or more per ton of molten pig iron. The gas stream impinges upon the surface 32 of the molten iron, the lance preferably being located with its lower end about 12 inches above the surface of the molten iron so as to protect the lance from damage. The lance is also provided with a water jacket at 33. For good results the bottom of the lance should not be located more than 4 feet above the top of the molten pig iron. The lance is preferably made of a heat resisting metallic alloy or refractory material. The pressure is maintained in the vessel by adjusting the inflow of gas through the lance, as compared to the outflow through exit vent 30 controlled by partially opened valve 34. This prevents substantial infiltration of air or other oxidizing gas into the vessel.

The treatment is continued for a suitable time until the desired amount of gas and the desulfurizing agent has been brought into operation. The sulphur content of the molten pig iron can be reduced until it is 50% by weight of the original sulphur content, or 25%, 10%, 5% or less. Final sulphur content may be as low as 0.001% sulphur by weight.

After the treatment the flow of the stream of gas and powdered desulfurizing agent is terminated, the lance is removed, and the iron is removed from the vessel for refining into steel or other uses as required. The supernatant desulfurizing powder may be removed before or after the iron is removed.

The process of the invention is readily controlled, and the operation is much simpler because of the elimination of the tuyeres or other means of introducing the gas beneath the metal surfaces. The ladle lining can be a conventional refractory brick, such as fire clay or magnesia. It is not readily attacked by the nonliquid desulfurizing agent.

Where the use of lime has been referred to above, other calcium desulfurizing agents capable of forming calcium sulphide may be used, such as calcium carbide, calcium cyanamide or the like. For most uses burned lime is the most desirable agent and is recommended because it is efficient and economical.

In view of my invention and disclosure, variations and modifications to meet individual whim or particular need will doubtless become evident to others skilled in the art, to obtain all or part of the benefits of my invention without copying the process shown, and I, therefore, claim all such insofar as they fall within the reasonable spirit and scope of my claims.

Having thus described my invention, what I claim as new and desire to secure by Letters Patent is:

1. The process of desulfurizing molten pig iron which comprises holding the molten pig iron under reducing conditions in a closed vessel which excludes air and is provided with a vent above the surface of the molten pig iron and blowing from a lance whose mouth is above the surface of the molten pig iron onto that surface a downwardly directed stream of inert gas at a pressure in the gas before it leaves the lance of at least one atmosphere above the pressure in the vessel and treating said molten iron with a desulfurizing agent until at least 20 cubic feet of inert gas at standard conditions of temperature and pressure per tone of pig iron has been discharged by the lance downward into the molten pig iron and thence passes upward through the molten iron, over said iron and outward through said vent.

2. The process of claim 1, which comprises blowing in from 1 to 50 pounds of solid powdered desulfurizing agent per ton of pig iron with the inert gas.

3. The process of claim 2, in which the desulfurizing agent is a calcium desulfurizing agent.

4. The process of claim 3, in which the desulfurizing agent contains a solid powdered deoxidizing agent to remove oxygen contained in the stream of inert gas.

5. The process of desulfurizing molten pig iron which comprises holding the molten pig iron under reducing conditions in a closed vessel which excludes air and is provided with a vent above the surface of the molten pig iron and blowing from a lance whose mouth is above the surface of the molten pig iron onto that surface a downwardly directed stream of inert gas at a pressure in the gas before it leaves the lance of at least ten atmospheres above the pressure in the vessel, until from 10 to 100 cubic feet of inert gas at standard conditions of temperature and pressure per ton of pig iron has been discharged by the lance downward into the molten pig iron and thence upward through the molten iron, over said iron and outward through said vent, and entraining in the inert gas before it impinges on the molten pig iron from 1 to 50 pounds of solid powdered calcium desulfurizing agent per ton of molten pig iron.

6. The method of claim 5, which comprises also entraining in the gas from 1 to 5% of solid powdered deoxidizing agent based to the weight of desulfurizing agent.

References Cited in the file of this patent

UNITED STATES PATENTS

| | | |
|---|---|---|
| 2,193,593 | Heuer | Mar. 12, 1940 |
| 2,587,573 | Wynne | Feb. 26, 1952 |
| 2,665,982 | Crego et al. | Jan. 12, 1954 |
| 2,811,436 | Heuer | Oct. 29, 1957 |

FOREIGN PATENTS

| | | |
|---|---|---|
| 622,419 | Great Britain | May 2, 1949 |
| 776,315 | Great Britain | June 5, 1957 |